Feb. 22, 1966 T. H. PALMER 3,237,181

GAS DETECTING CIRCUIT

Filed April 2, 1965

3,237,181
GAS DETECTING CIRCUIT
Thomas Henry Palmer, Stafford, England, assignor to The English Electric Company Limited, London, England, a British company
Filed Apr. 2, 1965, Ser. No. 444,964
Claims priority, application Great Britain, Feb. 5, 1960, 4,242/60
2 Claims. (Cl. 340—237)

This invention relates to a circuit arrangement for detecting the presence of small quantities of a combustible gas present in an atmosphere.

According to the present invention such a gas detecting circuit arrangement comprises, in combination, a gas detecting element incorporating a material which in the presence of the combustible gas acts as a catalyst to promote combustion of the combustible gas on the element and a consequential heating of the element, a closed vessel of low internal volume enclosing the gas detecting element and having at least a large part thereof made of a porous sintered metal through which the gases of an atmosphere surrounding the vessel may diffuse into the vessel, the said porous part of the closed vessel having a porosity such that the flow of gases from the surrounding atmosphere into the vessel is substantially impeded and such that gases from the surrounding atmosphere may diffuse into the vessel at a rate sufficient to just maintain combustion of the combustible gas adjacent the surface of the gas detecting element at a rate dependent upon the proportion of the combustible gas present in the atmosphere surrounding the vessel without causing any substantial pressure change inside the vessel, and the internal volume of the vessel being suitably low as to reduce to a low value the dissipation of heat from the gas detecting element by convection, and means for producing an electric signal dependent upon said heating causing a change in temperature of the gas detecting element brought about by said combustion of the combustible gas in contact therewith.

One gas detecting circuit arrangement according to the present invention for detecting the presence of methane in the atmosphere in a working of a coal mine will now be described by way of example with reference to the accompanying drawing.

Figure 1:
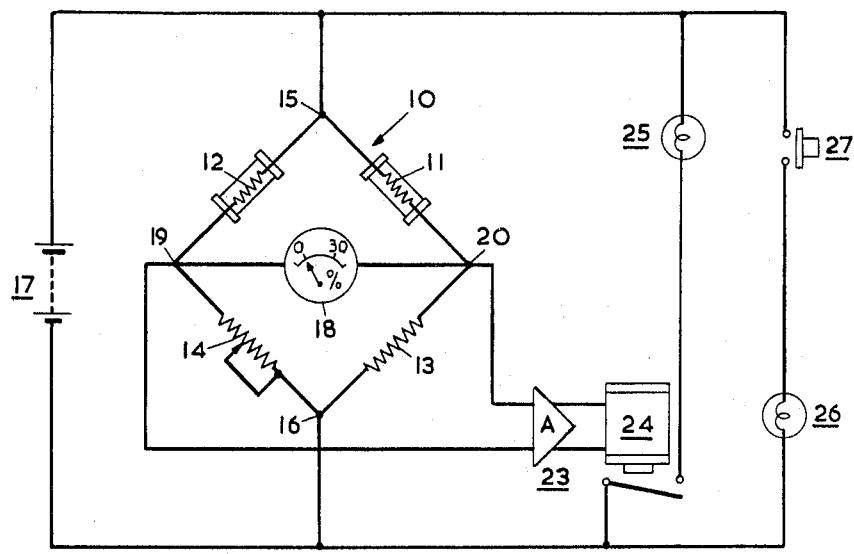
Figure 2:
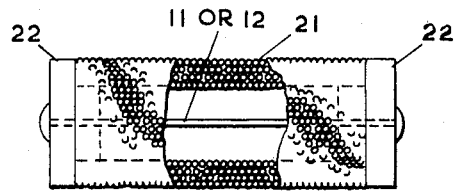

FIG. 1 shows diagrammatically the electrical circuit connections of the circuit arrangement, whilst FIG. 2 shows in greater detail the construction of a methane detecting device incorporated in the arrangement.

Referring now to the drawing, the methane detecting circuit arrangement includes an electrical bridge circuit arrangement 10 comprising four resistors 11 to 14 connected together in two parallel-connected circuits for energisation at the junctions 15, 16 by a battery 17. A sensitive millivolt meter 18 calibrated in terms of the percentage of methane present in the atmosphere is connected between the junction 19 of the resistors 12 and 14 and the junction 20 of the resistors 11 and 13.

The resistors 11 and 12 are made of platinum wire, and as will be best seen in FIG. 2 are enclosed in porous sintered cupro-nickel tubes 21 having insulating end caps 22 in which the resistors are secured. The end caps are secured to the tubes in a gas tight manner so that each tube and its associated end caps constitute a closed vessel enclosing a resistor and into which gases present in the atmosphere outside the vessel may readily diffuse by reason of the porous nature of the sintered metal tube. (The cupro-nickel tubes may alternatively be replaced by sintered bronze tubes.)

The platinum wire of the resistor 11 is of the kind which has been activated by the application to its external surface of a large number of finely-divided particles of platinum, so that in the presence of only small quantities of methane combustion of the methane takes place on the wire at a high rate, with a consequent heating of the resistor 11. The resistor 11 therefore constitutes the methane detecting element of the apparatus.

On the other hand, the platinum wire of the resistor 12 has no such coating of finely-divided platinum particles so that in the presence of methane substantially no combustion of this gas takes place, the resistance of the resistor 12 thus remaining substantially unaltered by the presence of methane.

The resistors 11 and 12 have the same electrical characteristics so that in the absence of methane and when at the same temperature they have the same resistance value. The resistor 12 therefore constitutes the temperature compensating element of the apparatus.

The resistors 13 and 14 are made of conventional electrical resistance material and are therefore unaffected by the presence of methane. They are arranged to be of equal resistance value, though the resistor 14 is provided with means for adjusting its resistance value so as to enable the bridge circuit arrangement to be balanced should it become unbalanced, otherwise than by being influenced by the presence of methane in the atmosphere.

An amplifier 23 has a control element (not shown) connected in parallel with the methane indicator 18, and the amplifier in turn supplies a relay 24 controlling a circuit from the battery 17 to a red methane warning lamp 25. The amplifier is arranged so that its output rises to a value sufficient to cause the relay to operate when the proportion of methane in the surrounding atmosphere has risen to a predetermined high value.

A white lamp 26 connected for supply from the battery 17 through a push button switch 27 provides illumination of the methane indicator 18 when used in dark parts of the mine working, and serves as a means for checking the state of the battery.

When the atmosphere surrounding the apparatus is free of methane, the bridge circuit arrangement is in a balanced condition, the resistance values of all of the bridge resistors 11 to 14 being equal, so that the methane indicator 18 responding to the zero potential difference between the junctions 19 and 20 indicates zero methane content. If, however, methane is present in the atmosphere, it diffuses with the other gases of the atmosphere through the porous tubes 21 into the spaces surrounding the resistors 11 and 12. Whilst the condition of the resistor 12 remains substantially unaltered, combustion of the methane on the activated surface of the platinum resistor 11 results in the heating of that resistor with a consequent increase in its resistance value. Such increase in resistance value modifies the electrical conditions in the bridge circuit arrangement, the current flowing through the resistor 11 being decreased and the potential of the junction 20 falling relative to that of the junction 19. The methane indicator 18 in response to the current now flowing through it from junction 19 to junction 20 indicates the percentage of methane present in the surrounding atmosphere. If the methane content of the atmosphere rises above a predetermined value, the output of the amplifier 23 reaches a value high enough to cause the operation of the relay 24 and the consequent illumination of the red methane warning light 25.

Since both of the platinum resistors 11 and 12 are subjected to the same atmospheric conditions compensation for changes in temperature of the gases of the atmosphere is automatically obtained since both platinum resistors are equally affected by such temperature changes.

The sintered metal tubes 21 are designed so as to enable the gases of an atmosphere outside the tubes to diffuse through their porous walls at a rate sufficient to enable the rate of combustion of methane on the resistor 11 to be proportional to the proportion of methane present in the atmosphere outside the tubes without causing any substantial change, positive or negative, in the gas pressure inside the space enclosed by the associated tube 21 and its end caps 22.

The sintered metal tubes allow the atmosphere within this enclosed space to change in accordance with changes in the atmosphere outside the tubes without any appreciable time delay. On the other hand the sintered metal tubes also serve to substantially reduce any effects which would otherwise be produced by large variations in the velocity of the atmospheric gases outside the tubes relative to the apparatus. Furthermore the sintered metal tubes render the apparatus intrinsically safe for use in methane-containing atmospheres.

Adjustment of the rate of gas diffusion through the walls of the sintered metal tubes may be obtained by the use of shielding sleeves (not shown) of non-porous material which fit closely around the sintered metal tubes and whose axial positions relative to the tubes may be adjusted so as to vary the effective areas of the tube surfaces available for the diffusion of gas. The rate of diffusion through the walls of the tubes may also be varied by painting a part of the external surface of each tube with a gas impervious substance.

Whereas in the above-described apparatus the resistors 11 and 12 are wholly enclosed in the porous sintered metal tubes, in another gas detecting apparatus according to the present invention only similar substantial parts of the resistors connected between the junctions 15 and 20 and 19 and 15 respectively may be incorporated in such porous tubes, the parts of the resistors not so enclosed in the tubes being of ordinary conventional resistor material.

The resistors 11 and 12 may be made of any other material, such as for example palladium, which has the property of acting as a catalyst to the reaction of methane with the oxygen present in the atmosphere.

Whereas in the above-described apparatus the activated platinum resistor 11 is directly heated by the combustion of methane on its own surface, in another generally similar gas detecting apparatus the resistor 11 is made from a less expensive and more resistive material, and the heating of this resistor is obtained by the combustion of methane on a piece of activated platinum disposed adjacent the resistor. In such a case the platinum parts do not carry the bridge circuit current but serve merely as a heating device for the resistor.

The sensitivity of the apparatus described above may be increased by replacing the resistor 14 by a further methane detecting element similar to the resistor 11 and by similarly enclosing it in a porous sintered metal tube; the resistor 13 is then also replaced by a resistor similar to the resistor 12, and is similarly enclosed in a porous sintered metal tube so as to provide temperature compensation.

If desired, the relay 24 may be omitted, the red warning lamp 25 in such a case being fed directly by the amplifier 23. Furthermore the methane indicator 18 may, if necessary, incorporate means for amplifying the potential difference appearing across the junctions 19 and 20.

The millivolt meter 18 used in the above-described apparatus may be calibrated in such a way at the ends of its scale as to indicate automatically the failure of either of the platinum resistors 11 and 12.

Whilst in many applications the present apparatus will be of a portable nature for carrying out inspections of mine workings and other similar hazardous places, in some situations it may be desirable to permanently install a methane detecting apparatus in one position and to use it for automatically de-energising electrical apparatus in that area when the concentration of methane in the atmosphere there rises above a predetermined high value. In such cases the relay 24 will also be arranged to initiate the automatic disconnection of the electrical supplies.

Whilst at first sight it might be thought that porous materials other than sintered metals would suffice for the manufacture of the thimbles, no other porous material has been found satisfactory for the purpose. Prior art proposals have suggested the use as flame traps, for preventing the ignition of a combustible gas under test, materials such as metallic gauze baffles and porous ceramic materials. It has been found however, that the results obtainable with sintered metal porous walls are far superior to those embodying the use of metal gauze or ceramic materials, and lead to practical constructions.

It has been found that for the size of closed vessel found suitable for automatic operation in accordance with the invention there is no suitable metal gauze which combines the qualities of offering the necessary resistance to external gas movements and of acting as a satisfactory and thoroughly reliable flame trap. This inability to act as a flame trap arises from the low strength which is obtainable from metallic gauzes which have the desired degree of porosity, this degree of porosity being determined by the required degree of insensitivity to variations in external gas velocity.

It has been found that with ceramic materials the particle sizes generally used are very much smaller than those which are required in the present instance for the closed vessel to function in the desired manner. The particle sizes are so small that in order to obtain the necessary rate of diffusion into the space enclosed the porous wall must have a substantially larger external surface area than that of the vessel having a sintered metal porous wall. Hence the volume enclosed by the ceramic vessel is much greater, and this results in a substantial convection effect inside the vessel due to the elevated temperature of the enclosed element. This convection effect renders the gas detecting element very susceptible to variations in output with variations in the attitude of the element. That is to say that the output varies as the position of the detecting element varies in space when immersed in an atmosphere of known methane content.

It has not been found possible to make ceramic walled vessels of particles of the size which has been found satisfactory with sintered metal particles, for the reason that neither the ceramic particles themselves nor the bonds which unite them are able to satisfactorily withstand the disruptive forces which can result from an ignition of the combustible gas present within the closed vessel, or which may result from accidental shock loads to which the vessels may be subjected in normal usage.

A sintered metal porous wall has a thermal conduction rate which is approximately one hundred times greater than that of the corresponding ceramic wall so that a sintered metal wall attains very quickly a uniform temperature, with the result that substantially no convection effects can arise within the enclosed space due to uneven temperatures in the porous wall.

The effect of varying the volume of the closed vessel has been found to be important since, though increasing the size of the enclosed space may result in an increase in the electrical output from the detecting element the increase in enclosed space also gives rise to greater convection effects within the closed space due to the temperature of the element itself so that the output of the detector becomes dependent in a substantial manner upon the attitude of the gas detecting element. Hence the output of the detector varies considerably with variation of the attitude of the detecting element.

In order to obtain a gas detecting apparatus with consistently good results, it is necessary to produce not only a gas detecting element which conforms to predetermined standards, but also to produce for the element an enclosing vessel which also has predetermined standards of performance. The ready control of the manufacture of sintered metallic porous walls lends itself to the production of closed vessels of closely defined performance.

By the use of a sintered metal porous wall for each closed vessel it has been found possible to obtain in a practical size of enclosure a diffusion rate suitable for fully automatic operation of the detector, so that no pumping or aspirating apparatus is necessary in order to bring a gas under test into contact with the gas detecting and temperature compensating elements. Furthermore, this automatic operation is achieved without the use of any form of linear amplifier for amplifying the output of the gas detecting and temperature compensating elements, though if a porous ceramic wall were used in place of the porous sintered metal wall, the construction of the ceramic wall being such as to provide an adequate flame trap, the output of the two elements would be so small that a linear amplifier with a substantial gain would have to be inserted in the circuit arrangement shown in FIGURE 1 in front of the gas detecting instrument 18 and the switching amplifier 23.

What I claim as my invention and desire to secure by Letters Patent is:

1. Circuit arrangement for detecting the presence of small quantities of a combustible gas present in an atmosphere comprising in combination a gas detecting element incorporating a material which in the presence of the combustible gas acts as a catalyst to promote combustion of the combustible gas on the element and a consequential heating of the element, a closed vessel of low internal volume enclosing the gas detecting element and having at least a large part thereof made of a porous sintered metal through which the gases of an atmosphere surrounding the vessel may diffuse into the vessel, the said porous part of the closed vessel having a porosity such that the flow of gases from the surrounding atmosphere into the vessel is substantially impeded and such that gases from the surrounding atmosphere may diffuse into the vessel at a rate sufficient to just maintain combustion of the combustible gas adjacent the surface of the gas detecting element at a rate dependent upon the proportion of the combustible gas present in the atmosphere surrounding the vessel without causing any substantial pressure change inside the vessel, and the internal volume of the vessel being suitably low as to reduce to a low value the dissipation of heat from the gas detecting element by convection, and means for producing an electric signal dependent upon said heating causing a change in temperature of the gas detecting element brought about by said combustion of the combustible gas in contact therewith.

2. Combustible gas detecting circuit arrangement according to claim 1, wherein the said part of porous sintered metal comprises a mass of cupro-nickel metal particles sintered together.

No references cited.

NEIL C. READ, *Primary Examiner.*